US011264873B2

(12) United States Patent
Gabrys et al.

(10) Patent No.: US 11,264,873 B2
(45) Date of Patent: Mar. 1, 2022

(54) PROCESS FOR ASSEMBLY OF AIR CORE MOTOR-GENERATORS

(71) Applicants: Christopher W. Gabrys, Reno, NV (US); Timothy S. Rodgers, Bainbridge Island, WA (US)

(72) Inventors: Christopher W. Gabrys, Reno, NV (US); Timothy S. Rodgers, Bainbridge Island, WA (US)

(73) Assignee: Revolution Electric Company, Inc., Reno, NV (US)

( * ) Notice: Subject to any disclaimer, the term of this patent is extended or adjusted under 35 U.S.C. 154(b) by 143 days.

(21) Appl. No.: 16/368,797

(22) Filed: Mar. 28, 2019

(65) Prior Publication Data
US 2020/0313526 A1 Oct. 1, 2020

(51) Int. Cl.
*H02K 15/06* (2006.01)
*H02K 3/28* (2006.01)
(Continued)

(52) U.S. Cl.
CPC .......... *H02K 15/061* (2013.01); *H02K 1/182* (2013.01); *H02K 1/27* (2013.01); *H02K 3/28* (2013.01);
(Continued)

(58) Field of Classification Search
CPC ...... H02K 15/061; H02K 15/03; H02K 15/04; H02K 3/28; H02K 3/47; H02K 1/27;
(Continued)

(56) References Cited

U.S. PATENT DOCUMENTS

| | | | | |
|---|---|---|---|---|
| 5,412,880 A | * | 5/1995 | Raab | G01B 5/008 33/503 |
| 7,402,934 B1 | * | 7/2008 | Gabrys | H02K 3/345 310/179 |

(Continued)

*Primary Examiner* — Donghai D Nguyen
(74) *Attorney, Agent, or Firm* — J. Michael Neary

(57) ABSTRACT

A process for assembly of a brushless air core motor-generator includes assembling a rotor formed from two spaced apart rotor portions having magnetic poles that drive magnetic flux circumferentially through the rotor portions and back and forth across an armature airgap between the rotor portions. An air core armature is made by coating a nonmagnetic armature form with a tacky adhesive layer, and winding armature windings in a winding pattern onto the form with a winding head, using wire comprised of bundled multiple individually insulated conductor strands that are electrically connected in parallel but are electrically insulated from each other along their lengths where located inside the magnetic flux in the armature airgap. The armature windings are adhered to the nonmagnetic form simultaneously as the winding head traverses the winding pattern while applying pressure to the wire against the tacky adhesive, so tack of the tacky adhesive layer holds the wire to the armature form during the winding process, in the winding pattern later required for magnetic torque production. The air core armature is inserted into the armature airgap and mounted to a stator of the motor-generator for production of magnetically induced torque between the rotor and the stator.

20 Claims, 13 Drawing Sheets

(51) Int. Cl.
  *H02K 1/27*   (2022.01)
  *H02K 15/03*  (2006.01)
  *H02K 21/22*  (2006.01)
  *H02K 3/47*   (2006.01)
  *H02K 1/18*   (2006.01)

(52) U.S. Cl.
  CPC ............... *H02K 3/47* (2013.01); *H02K 15/03* (2013.01); *H02K 21/22* (2013.01); *Y10T 29/49009* (2015.01)

(58) Field of Classification Search
  CPC .......... H02K 1/22; H02K 1/182; H02K 21/24; H02K 21/14; Y10T 29/49009; Y10T 29/49073; Y10T 29/53143
  USPC .................................................. 29/596, 605
  See application file for complete search history.

(56) References Cited

U.S. PATENT DOCUMENTS

| | | | |
|---|---|---|---|
| 8,736,133 B1 * | 5/2014 | Smith | H02K 3/26 310/208 |
| 10,749,419 B2 * | 8/2020 | Gabrys | H02K 15/08 |

\* cited by examiner

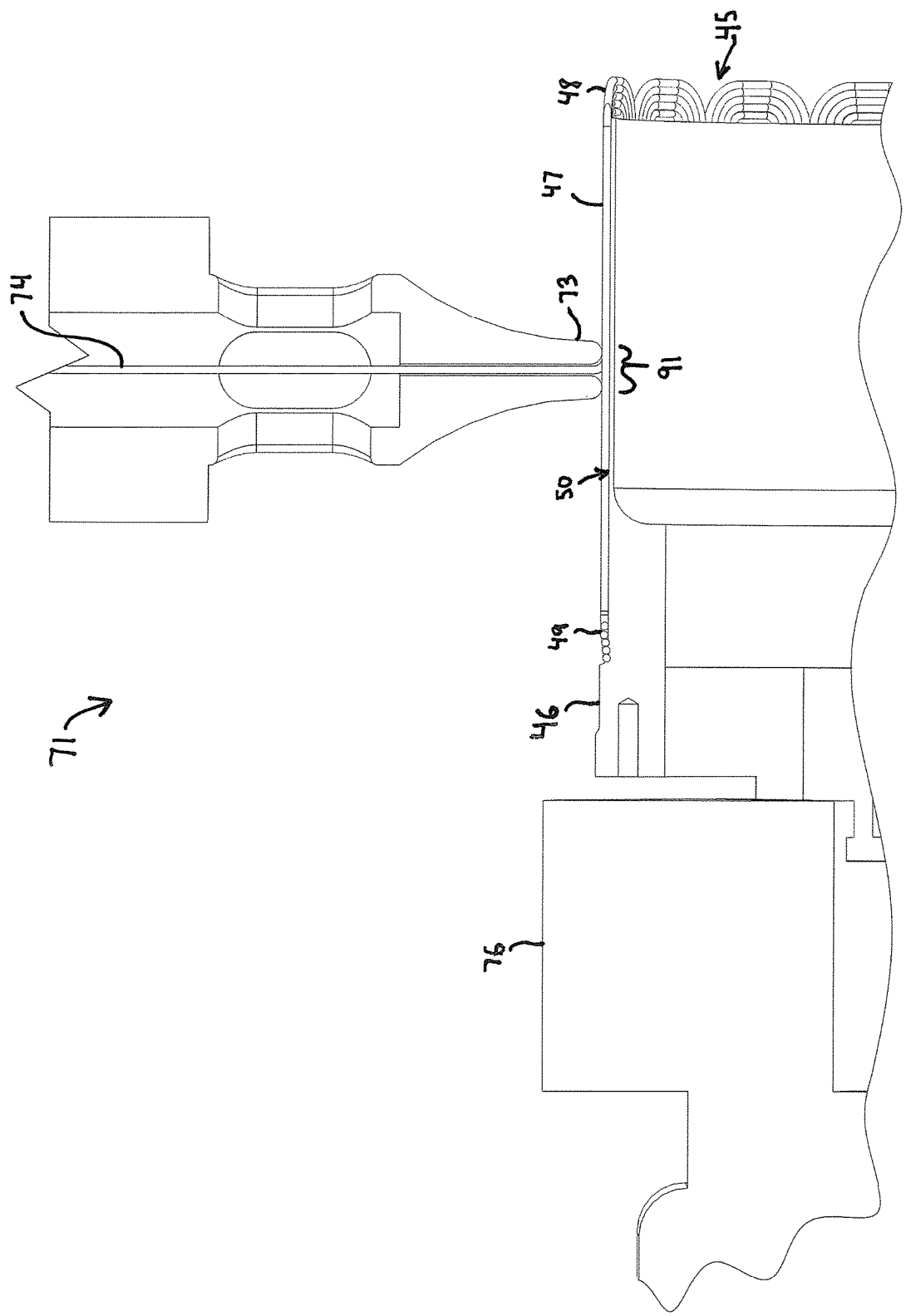

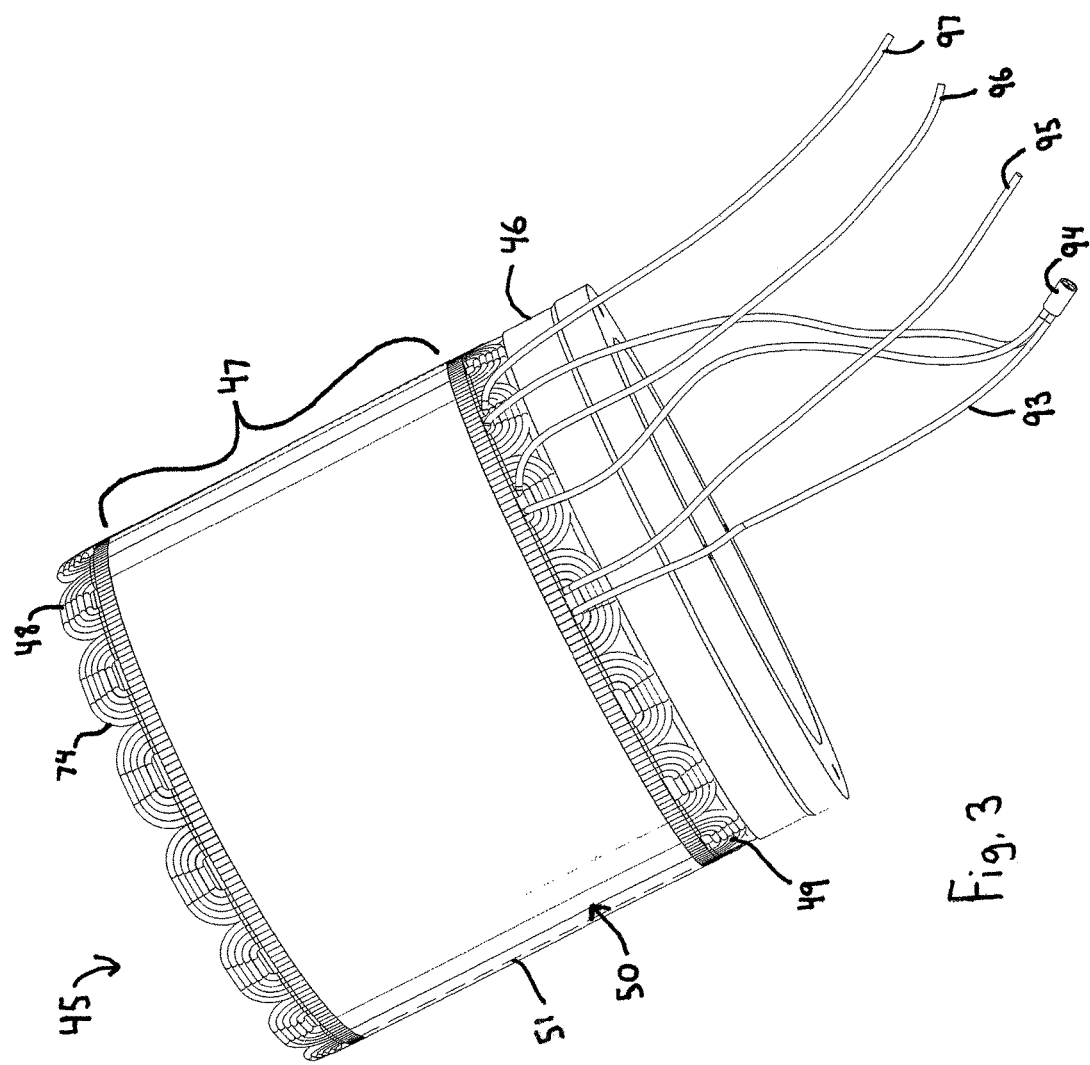

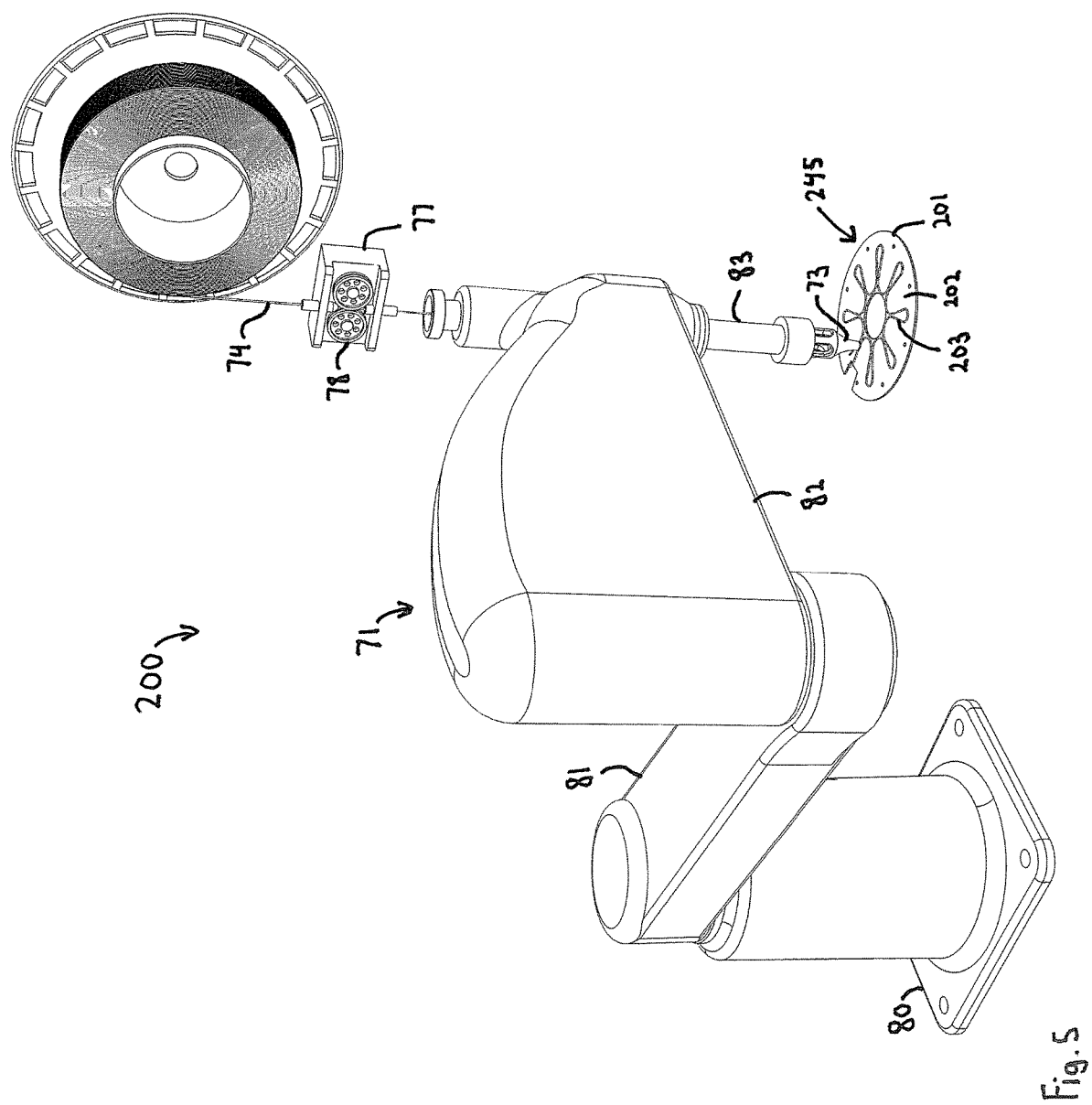

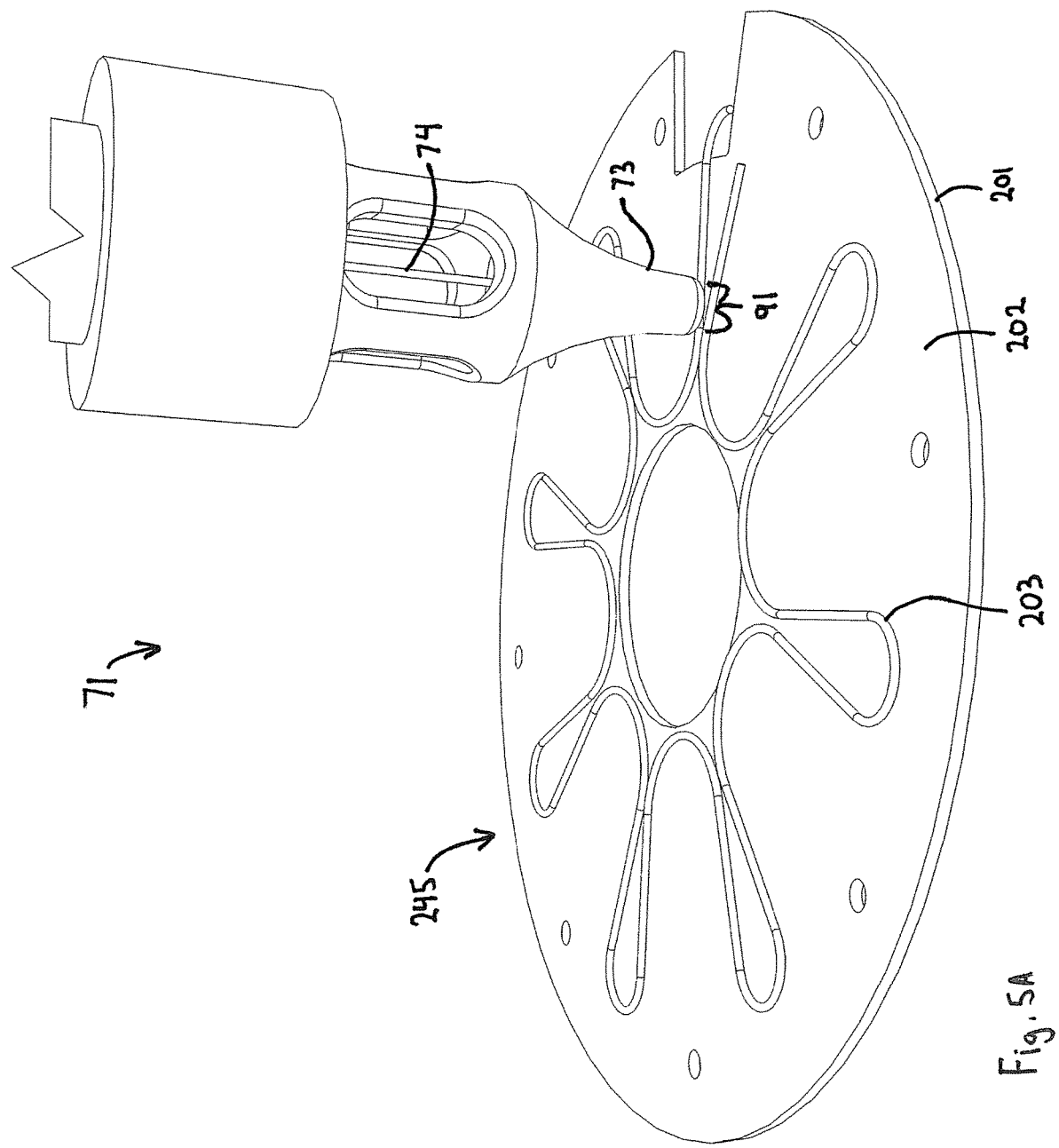

| | | |
|---|---|---|
| 601 — Armature Resin Potting Required | → | No |
| 602 — Armature Mold Cleanup Required | → | No |
| 603 — Hand Assembly Required | → | No |
| 604 — Armature Winding Time | → | 2 minutes, (@ 60 m/min) |
| 605 — Number of Electrical Connections | → | 4, (1 wye, 3 power leads) |
| 606 — Armature Manufacturing Consistency | → | Exceptional |
| 607 — M/G Operating Efficiency | → | Exceptional |

PROCESS FOR ASSEMBLY OF AIR CORE MOTOR-GENERATORS

This invention pertains to motor-generators for converting between electrical and mechanical energy, and more particularly to a new process for assembly of air core motor-generators yielding high electro-mechanical energy conversion efficiency and power density. The unique process now makes manufacturing of these machines possible at much higher rates while being highly automated.

BACKGROUND OF THE INVENTION

Electric motor-generators convert between electric and rotary mechanical power. Motors currently consume more than 50% of electrical power produced. There is a great desire to increase the efficiency of electric motors for saving energy and reducing pollution to the environment.

The efficiency of electric motor-generators can potentially be increased by reducing the resistive and magnetic induced losses. Magnetic losses include both hysteresis and eddy current losses and are the result of changing magnetic field through different parts of the motor-generator.

One type of electrical machine that can provide for reduced magnetic induced losses is an air core construction. Air core motor-generators place the windings within a magnetic airgap, and not in slots cut into an iron stator as in conventional electrical machines. However, there are different types and configurations and not all air core constructions result in high efficiency.

One additional problem with air core motor-generators is the production of the armatures in mass manufacturing at the lowest possible costs. If they cannot be produced at low costs, they will not be successful. More and more, it is desirable to have manufacturing automated. However, even with traditional motor-generators, there is typically substantial manual labor in production. To date, air core motor-generators have used significant manual labor and possibly more than traditional electrical machines.

It would be desirable to develop a new process to produce air core motor-generators; machines with the highest possible energy conversion efficiency (preferably meeting and/or exceeding new IE4 levels) and that can produce them at a very high rate and be uniquely compatible for automation. Such a new process could make new energy efficient motor-generators widespread and could really make a difference in global energy use.

SUMMARY OF THE INVENTION

The invention provides a process for high rate automated production of air core motor-generators that can operate with higher efficiency and power density than conventional motor-generators. The higher performance is achieved through the reduction of resistive and magnetically induced losses including hysteresis and eddy currents from the special construction whereby a circumferentially varying magnetic flux is not passed through a ferromagnetic stator. Up until now, fabrication of such machines has been time consuming and labor intensive, which has limited their adoption. The process comprises assembling a rotor formed from two spaced apart rotor portions having magnetic poles that drive magnetic flux circumferentially through the rotor portions and back and forth across an armature airgap formed between said rotor portions. The process further comprises forming an air core armature by coating a substantially nonmagnetic armature form with a tacky adhesive layer, and winding armature windings into a winding pattern on to the substantially nonmagnetic form with a winding head, using wire comprised of bundled multiple individually insulated conductor strands that are electrically connected in parallel but are electrically insulated from each other along their length where located inside the magnetic flux in the armature airgap. The strands of wire may be diametrically held together by an outer serve to protect them during the winding process. The winding process comprises adhering the armature windings to the substantially nonmagnetic form simultaneously as the winding head traverses the winding pressure while pressure is applied to the wire against the tacky adhesive. The tack of the tacky adhesive holds the wire to the substantially nonmagnetic armature form during the winding process, in the winding pattern later required for magnetic torque production. After completing the windings, the air core armature is inserted into the armature airgap and mounted to the stator of the motor-generator for production of magnetically induced torque between the rotor and the stator. We have found that the winding process is surprisingly very effective because of the combination of uniquely high wire flexibility allowing it to be readily adhered (without significant bending memory) to the tacky adhesive layer on the substantially non-magnetic form.

In an additional embodiment of the invention, the tacky adhesive layer preferably comprises a film adhesive. The film adhesive is applied to the substantially non-magnetic form prior to the winding process. Many different types of film adhesives can be utilized so long as they possess sufficient tack to hold the wires during the winding process. Two types of film adhesives are structural adhesives, which can be cured for high strength, and pressure sensitive adhesives that have very high room temperature tack. Unlike conventional manufacturing of air core armatures that utilize potting, no molding is necessary, allowing much higher speed manufacturing. Likewise, no temporary tooling is necessarily for shaping the windings. The windings are formed right onto the substantially non-magnetic form which is later inserted directly into the armature airgap. The motor-generators do not need a laminated steel stator and the windings do not require bonding into a steel stator.

In a further embodiment, the film adhesive comprises a B-staged thermoset polymer film. Structural adhesives such as this typically have lower room temperature tackiness which makes the winding process more difficult. However, the winding can be accomplished at a slightly elevated temperature for high tackiness. After winding is completed, the polymer film maybe further cured for high strength. Preferably the windings are adhered to the substantially non-magnetic form in the active region, portions traversing inside the magnetic flux that generate torque. Windings also comprise end turns which traverse circumstantially and do not generate torque. End turns are not required to be adhered to the form accordingly and may be free and unsupported.

In yet an additional embodiment, the process also comprises multiple individually insulated conductor strands of the wire having a layer of thermoplastic polymer coating. The strands are heated and bonded to each other after the wire has been adhered in the winding pattern to the substantially nonmagnetic armature form. This provides several benefits including increasing the structural stiffness of the air core armature, reducing tendency for the active region winding portions from peeling off the form and holding the design rigid shape of the end turns to facilitate easier armature insertion into the armature airgap.

The placement of the flexible winding wire into the desired winding pattern for electromagnetic torque production and pressing into the tacky adhesive layer is preferably done by automated process. In an additional embodiment of the invention, the windings are applied to the substantially nonmagnetic armature form by a nonlinear robot that forms the winding pattern and applies pressure to the wire against said tacky adhesive layer on the substantially nonmagnetic armature form. Nonlinear robots, such as a Selective Compliance Assembly Robot Arm (SCARA), provide the advantage of much higher speed motions than linear, Cartesian type robots as well as having easier and unhindered mounting among other benefits. A SCARA robot is a nonlinear robot using a parallel-axis joint layout, which is slightly compliant in the X-Y direction but rigid in the Z direction. It provides for very fast and repeatable movement and windings placement with high durability in this application. The rigidity in the Z direction is beneficial for accurate application and higher force on the wire against the tacky adhesive, while the compliance and the X-Y directions provides for very fast articulation in traversing of the required winding patterns. SCARA robots are also very cost effective well suited for the winding due to the limited required vertical motion. Recent developments have been made adding some added compliance to the Z direction of SCARA robots, such as for limiting force in the Z direction potential while assembly parts downward. However, the movement in the upward direction typically does not benefit from compliance. Therefore compliance is in only one direction, and still qualifies as a SCARA robot. Such added compliance may be active, by electrically adding compliance in the downward motion of the actuator, or passive such as through spring type end effector supporting the winding head.

In an additional embodiment, the winding pattern is formed by the winding head which dispenses wire into the winding pattern with an orifice which also applies force to the wire against tacky adhesive. A toroidal orifice shape is preferably used for high speed with limited damage to the winding wire and ability to dispense in all X-Y directions required for winding both active length portions and end turns and also apply downward pressure to the wire against the tacky adhesive. Other orifice geometries and winding head dispensing methods could also be used as long as they can rapidly and accurately form and adhere the winding patterns reliably without damaging the wire insulation.

If a structural adhesive is utilized for the tacky adhesive layer, it may be post cured to provide a sufficient bonding between the wires and form for torque generation. However, in some cases it may be preferable to utilize a pressure sensitive adhesive instead due to higher tack and no need to post cure. Pressure sensitive adhesives may not have sufficient lap shear strength alone for operation of the motor-generator. In radial gap motor-generators, this can be overcome by over wrapping the windings with a hoop tensioned layer. In a further embodiment of the invention, the motor-generator comprises a radial armature airgap and the substantially nonmagnetic armature form comprises a tube. The process further comprises over-wrapping the windings with a hoop tensioned layer that radially compresses the wire against the tacky adhesive layer after completion of the winding pattern. In a simple form the layer may be just a layer of tape that increases the resistance of the windings to moving in operation. Acrylic or silicone adhesive, polyester tape is one such tape that can be used. Fiber reinforced layers can be alternatively used for increased strength. Preferably, the tensioned layer is applied with a tension force per axial length exerting radial compression on the substantially nonmagnetic armature form that is less than the first diametral critical buckling load of the tube. This prevents the air core armature from becoming egg shaped from application of the tensioned layer.

In other embodiments of the invention, the process for assembly of a brushless air core motor-generator comprises assembling a rotor of a motor-generator, forming an air core armature by coating a stator portion with a tacky adhesive layer, and winding armature windings into a winding pattern on the stator portion using wire comprised of bundled multiple individually insulated conductor strands that are electrically connected in parallel but are electrically insulated from each other along their length where located inside magnetic flux of said motor-generator. The winding comprising adhering the wire simultaneously as a winding head traverses the winding pattern while pressure is applied to the wire against the tacky adhesive, wherein tack of the tacky adhesive layer holds the wire to the stator portion while during the winding process, in the winding pattern later required for magnetic torque production. Upon completion of the stator portion, it is assembled with the rotor for production of magnetically induced torque between the rotor and stator. It should be noted that the wire construction provides the benefits of flexible windings wire for high speed winding and at the same time precludes development of significant eddy current losses in the air core armature. The process can be utilized for production of both radial gap and axial gap air core motor-generators. In this embodiment, the windings can be wound on a stator comprising a nonmagnetic form for subsequent insertion into an armature airgap formed between two rotating surfaces of a rotor, or alternately can be wound onto a loss mitigating ferromagnetic inner core for insertion into armature airgap formed with a single rotating rotor surface. Such a loss mitigating surface could comprise laminations, wound wire or polymer bound steel powder or others. Although a potentially simpler construction, it could have increased costs and higher magnetic induced losses than winding on a nonmagnetic form.

The winding head dispenses the wire and applies pressure to it against the tacky adhesive on the stator. To facilitate highest speed stator manufacturer, and in another embodiment of the invention, wire is fed to the winding head using a forward wire feeding system that feeds the wire at a rate approximately equivalent to the rate of distance traveled by the winding head relative to the stator when adhering the wire. This method prevents excessive tension on the wire where being adhered that could unseat it from the desired winding pattern as well as overspooling, and facilitates turning at the end turn portions of the windings.

Winding patterns for the electromagnetic toque production can use conventional coils, however a more preferable pattern and further embodiment is that the winding head moves to apply the windings to the stator portion in a serpentine winding pattern wherein windings of a single phase are wound by traversing multiple times around the circumference of the stator portion. This winding pattern allows for high speed winding, continuous phase windings without the need for interconnection of coils of a given phase and with minimized end turn overlapping of different phases

DESCRIPTION OF THE DRAWINGS

The invention and its many advantages and features will become better understood upon reading the following detailed description of the preferred embodiments in conjunction with the following drawings, wherein:

FIG. 2A is a schematic drawing of the winding head used for creating the winding pattern in the radial gap air core armature in the armature manufacturing process of FIG. 2 in accordance with the invention.

FIG. 3 is a schematic drawing of a completed radial gap air core armature produced by the armature manufacturing process of FIG. 2 in accordance with the invention.

FIG. 5 is a schematic drawing of an armature manufacturing process for production of armatures for use in the axial gap air core motor-generator of FIG. 4 in accordance with the invention;

FIG. 5A is a schematic drawing of the winding head used for creating the winding pattern in the axial gap air core armature in the armature manufacturing process of FIG. 5 in accordance with the invention.

DESCRIPTION OF THE PREFERRED EMBODIMENT

Figure 1:
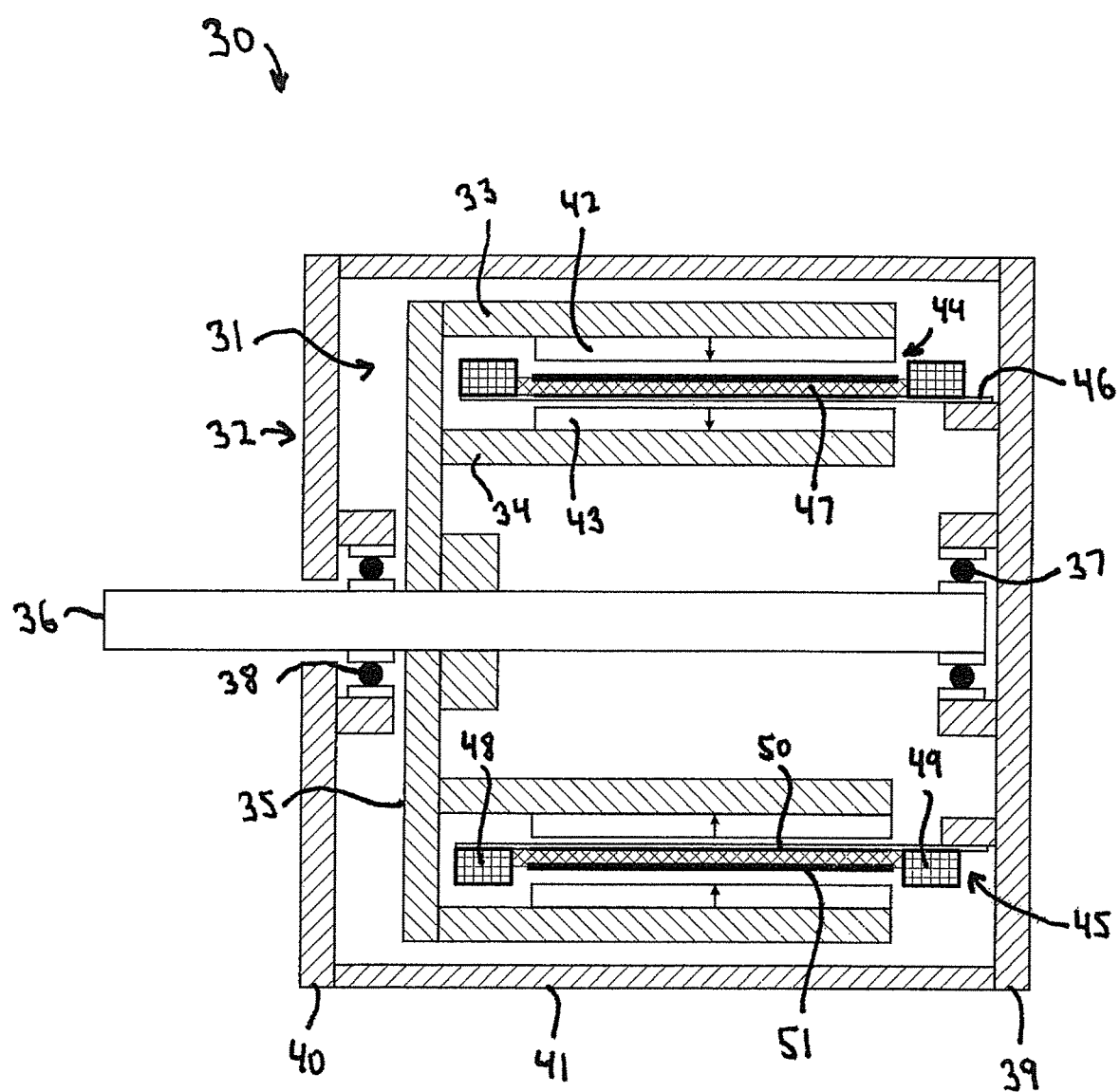
FIG. 1 is a schematic drawing of a radial gap air core motor-generator in accordance with the invention.

Turning to the drawings, wherein like reference characters designate identical or corresponding parts, FIG. 1 shows an air core motor-generator in accordance with the invention. The motor-generator 30 is comprised of a rotor 31 and a stator 32. The rotor 31 is constructed of two concentric spaced apart steel rotor cylinders 33, 34 that are attached to a hub 35. The hub 35 is supported by center shaft 36 journaled for rotation by bearings 37, 38. The bearings 37, 38 are mounted in housing end plates 39, 40 which are connected together by outer housing tube 41. Attached to the rotor tubes 33, 34 are circumferential alternating polarity permanent magnet arrays 42, 43 that drive magnetic flux back and forth between the rotor tubes 33, 34 and an armature airgap 44 created there between. Located within the armature airgap 44 is an air core armature 45 that is attached to the stationary housing end plate 39. The air core armature 45 is constructed of a nonmagnetic form tube 46 that extends into the armature airgap 44 and is used to support multiple phase winding active lengths 47 and end turns 48, 49 at either end of the active lengths 47. The windings 47, 48, 49 are wound with wire comprised of multiple strands that are electrically connected in parallel but are electrically insulated from each other along their length when located inside the armature airgap 44. The strands are preferably held together and protected against insulation damage by an outer serve. The winding active lengths 47 are adhered to the form 46 through use of a pressure sensitive adhesive 50 during the winding process. The pressure sensitive adhesive 50 may preferably comprise a B-staged thermoset film adhesive that is adhered to the form 46 prior to winding and is preferably warmed to increase adhesion of windings active lengths 47 to the form 46 during winding. The windings 47, 48, 49 comprise active lengths 47 that are run axially with multiple phases lying in a single layer and are located within the armature airgap 44 and receive the magnetic flux from the magnetic arrays 42, 43. The windings 47, 48, 49 also comprise end turns 48, 49 that run circumferentially, overlap multiple phases and are located outside of the armature airgap 44. An outer tensioned overwrap 51 of fiberglass/epoxy may also be used to wrap the windings active lengths 47 and preferable compress them to shrink the required thickness of the armature airgap. After winding, the windings active lengths 47 are preferably permanently secured to the form either through curing the film adhesive 50, by the overwrap 51, or by both.

Figure 1A:
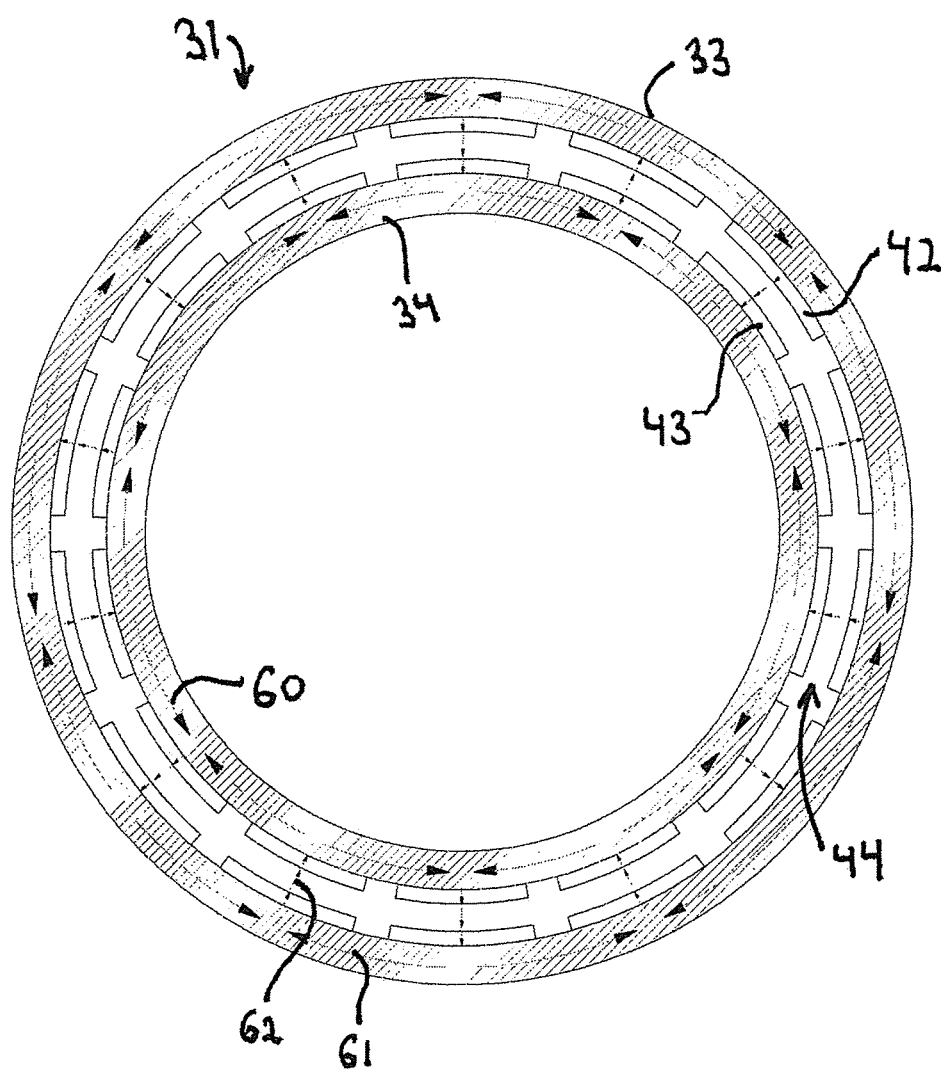
FIG. 1A is a schematic drawing of the end view of the rotor of the radial gap air core motor-generator of FIG. 1 in accordance with the invention.

A schematic drawing of the end view of the rotor of the radial gap air core motor-generator of FIG. 1 in accordance with the invention is shown in FIG. 1A. The rotor 31 is comprised of two spaced apart rotor portions 33, 34 constructed of steel, and have magnets 42, 43 that drive magnetic flux circumferentially, as shown at 60, 61, through the rotor portions and radially 62 across the armature airgap 44.

Figure 2:
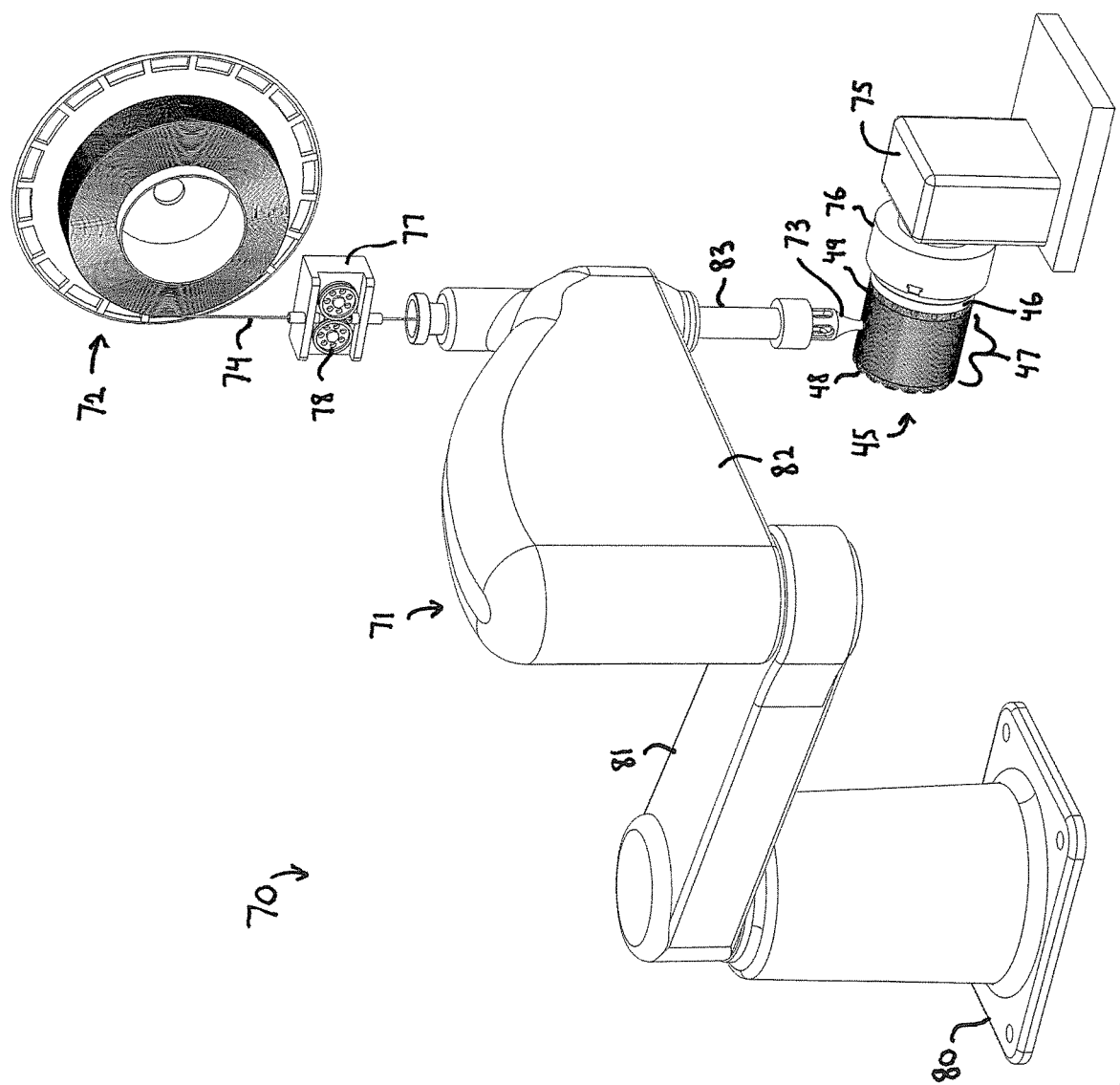
FIG. 2 is a schematic drawing of an armature manufacturing process for production of armatures for use in the radial gap air core motor-generator of FIG. 1 in accordance with the invention.

A schematic drawing of an armature manufacturing process for production of armatures for use in the air core motor-generator of FIG. 1 in accordance with the invention is shown in FIG. 2. The process comprises the use of a nonlinear robot, particularly a Selective Compliance Assembly Robot Arm. The SCARA robot allows for quick and precise movements with rigidity and greater force application in the vertical direction. In this invention, the SCARA robot is uniquely used to place specially constructed wire and to also feed out the wire and to uniquely apply pressure to the wire against an armature stator, wherein the stator has an applied pressure sensitive adhesive to hold the windings shape temporarily in a shape for later electromagnetic torque production. The windings of multiple phases are wound onto the stator and the pressure sensitive adhesive holds the active length portions of the windings temporarily in place during the winding process. The end turns, do not generate electromagnetic torque with the rotor, are located outside of the magnetic airgap and are necessarily overlapping. It should be noted that the most efficient winding method comprises active lengths that are perpendicular to the circumferential direction inside the armature airgap magnetic flux, with end turns running circumferentially and outside the armature airgap magnetic flux. However, it is also possible to apply the invention using angled windings that combine a circumferential component to the active lengths inside the armature airgap, although not as efficient or as cost effective use of the magnet material.

As shown in FIG. 2, the armature manufacturing process 70 uses a SCARA robot 71 to wind special multiple individually insulated strand conductor wire 74 from a spool 72 on to a non-magnetic cylindrical form 46 to make an air core armature 45, as shown on more detail in FIG. 1. The SCARA robot 71 comprises a pedestal mount 80 that supports two serial linked arms sections 81, 82 coupled by two parallel (vertical) axis joints that cooperate to provide X-Y compliance. A linear (vertical) Z axis 83 provides for vertical motion having higher rigidity. The spool 72 is preferably mounted above the robot 71 for direct wire feeding. To assist for very high rate winding as well as assisting in the creation of end turns 48, 49, a forward wire feeding system 77 comprising driven feed rollers 78 can be used to feed wire 74 to the winding head 73. The SCARA robot 71 has a winding head 73 that feeds out the wire 74 and pressures the active length windings 47 against the pressure sensitive adhesive 50 on the armature form 46. At each end of the form 46, the winding head 73 forms the end turns 48, 49. In a further embodiment, the forward wire feed system 77 feeds wire at a rate approximately equivalent to the rate of distance traveled by the winding head relative to the form when adhering the wire. This minimizes and/or controls the winding tension to prevent disbonding of previously adhered wire. The windings 47, 48, 49 are preferably wound as serpentine patterns whereby each phase is constructed by winding multiple times around the circumference of the armature 45. Although other patterns could be used, the benefit of this winding pattern is a minimized windings length and resistance and also a minimum number of required electrical connections. In an additional preferred embodiment, each of the phases is wound consecutively and is subsequently cut to produce each separate phase winding. After completing a single phase, the winding head 73 can feed out a loop of extra wire before starting the winding of the next phase and this loop can be cut after completion of the winding process to yield individual phases having leads. The winding process also includes a headstock 75 with chuck 76 that holds the armature form 46 and rotates precisely and in unison with the motions of the payout to create the windings pattern. To minimize the twisting in the wire 74 between the spool 72 and payout 73, it may be desirable that the winding direction of the headstock 75 is alternated between the winding of successive phases. After winding is completed, the windings are preferably permanently secured either by curing the adhesive, overwrapping the windings or other means. It is also possible that a pressure sensitive adhesive could be used that has sufficient adhesion and temperature capability that does not require curing. However, a crosslinked thermoset adhesive would generally provide the highest strength and temperature capability.

A schematic drawing of the winding head used for creating the winding pattern in the radial gap air core armature in the armature manufacturing process of FIG. 2 in accordance with the invention is shown in FIG. 2A. The robot 71 is show with winding head 73 applying the winding wire 74 to the film adhesive 50 on a polycarbonate armature form 46 to create the air core armature 45. The wire 74 is dispensed by the winding head 73 through a rounded or toroidal orifice 91 that also applies pressure to the wire 74 against the adhesive 50. The armature form 46 is rotated by a headstock driven chuck 76 that supports the form 46 at the ends of the longitudinal active lengths 47 to create end turns 48, 49. Winding speed capability is driven by factors of critical importance including the tackiness of the adhesive 50 for strong, simultaneous, instant adhesion; minimized and controlled tension to prevent unbonding of the wire 74; and robot winding head 73 speed to a lesser extent due to the very high rate capability of nonlinear and SCARA robots in particular.

Figure 2B:
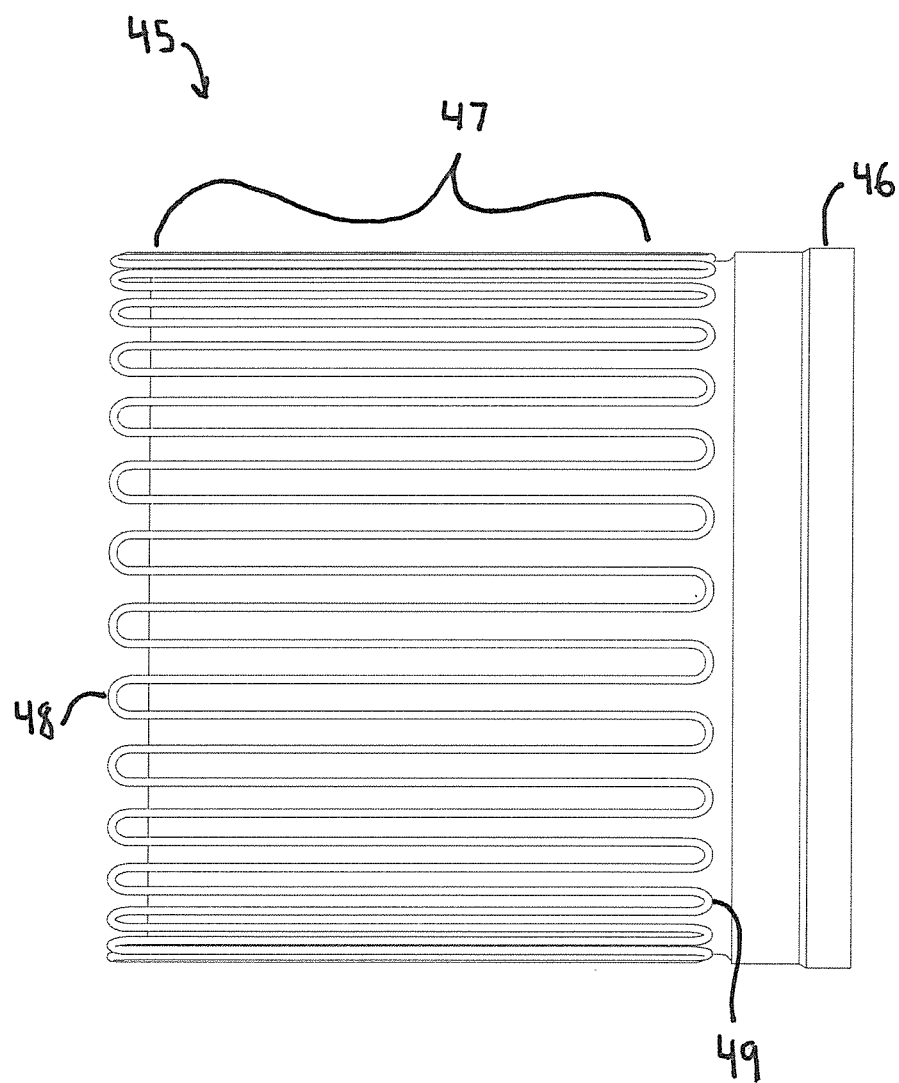
FIG. 2B is a preferred winding pattern of the radial gap air core armature of FIG. 2 in accordance with the invention.

A schematic drawing of the preferred winding pattern of the radial gap air core armature of FIG. 2 in accordance with the invention is shown in FIG. 2B. The air core armature is comprised of a fiberglass reinforced polymer tube 46. Windings comprise active length portions 47, that will be located within the magnetic flux for torque generation and end turns 49 and 49 at the ends of the form. The winding wire 74 is adhered to the circumference of the form 46 in a serpentine path using the tackiness of the pressure sensitive adhesive film. Typical construction most commonly winds three phases of windings.

A schematic drawing of a completed radial gap air core armature produced by the armature manufacturing process of FIG. 2 in accordance with the invention is shown in FIG. 3. The air core armature 45 comprises winding wire 74 that forms active lengths 47 and circumferentially looping end turns 48, 49. The wire 74 is wound by applied pressure to it against a tacky adhesive 50 applied to the surface of the nonmagnetic form 46. After all the phase windings are adhered, the active lengths portion 47 is overwrapped with a tensioned band 92, such as tape or fiberglass epoxy towpreg. The simplest and easiest is the application of tape such as silicone adhesive on polyester tape which has sufficient temperature capability due to the low temperature rise resulting from the very high efficiency of the air core motor-generators of the invention. Preferably three phase windings are wound by the winding head and provide for six leads 93, and allow a single wye leads connection point 94 and only three armature power connection leads 95, 96, 97.

Figure 4:
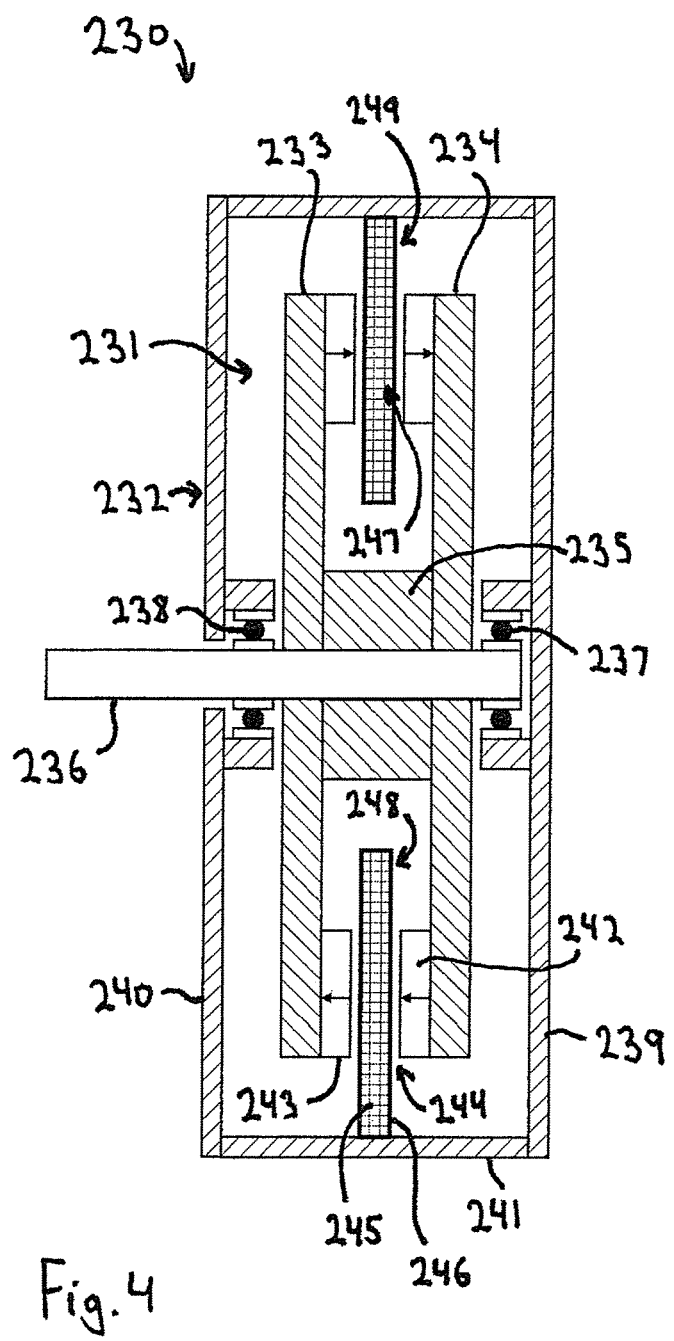
FIG. 4 is a schematic drawing of an axial gap air core motor-generator in accordance with the invention.

A schematic drawing of an axial gap air core motor-generator in accordance with the invention is shown in FIG. 4. For axial gap air core motor-generators, the armature is constructed as a flat disk. The axial gap motor-generator 230 is comprised of a rotor 231 and a stator 232. The rotor 231 is formed from two spaced apart steel disks 233 and 234 that are connected by a central hub 235. The rotor 231 is journaled for rotation by bearings 237 and 238 which are supported by the housing end plates 239, 240. Outer housing tube 241 connects the housing end plates 239, 240 and also supports the air core armature 245 within the armature airgap 244 through mount connection 246. The air core armature 245 comprises active length portions 247 and inner and outer end turn portions 248, 249. Located on the two rotor disks are permanent magnets 242, 243 that drive magnetic flux circumferentially through the rotor portions 233, 234 and across the armature airgap 244. It is also possible to utilize rotor disks 233, 234 not constructed from steel and then the magnets 242, 243 would utilize a Halbach array to conduct the flux circumferential on the rotor.

A schematic drawing of an armature manufacturing process for production of armatures for use in the axial gap air core motor-generator of FIG. 4 in accordance with the invention is shown in FIG. 5. The manufacturing process 200 uses a SCARA robot 71 to wind the windings wire 74 onto the air core armature 245. The SCARA robot 71 comprises a pedestal mount 80 that supports two serial linked arms sections 81, 82 coupled by two parallel (vertical) axis joints that cooperate to provide X-Y compliance. A linear (vertical) Z axis 83 provides for vertical motion having higher rigidity. The spool 72 is preferably mounted above the robot 71 for direct wire feeding. To assist for very high rate winding, a forward wire feeding system 77 comprising driven feed rollers 78 can be used to feed wire 74 to the winding head 73. The armature form 201 is constructed of a flat sheet of fiberglass reinforced epoxy with a surface layer of B-staged epoxy film adhesive 202. To increase the tackiness of the film adhesive 201 while winding, the ambient temperature may be increased. What is important is that the adhesive layer in the area is tacky before the wire is pressured against it, so as to facilitate high speed winding. The SCARA robot 71 has a winding head 73 that forms the winding pattern 203 by moving in the desired pattern and applying pressure to the windings wire 74 against the tacky adhesive layer 202 and substantially non-magnetic form 201. After completion of winding the air core armature 245, it is preferably over cured to increase the lap shear strength between the winding wire 74 and form 201.

A schematic drawing of the winding head used for creating the winding pattern in the axial gap air core armature in the armature manufacturing process of FIG. 5 in accordance with the invention is shown in FIG. 5A. The SCARA robot 71 winds the wire 74 onto the armature form 201 to create the winding pattern 203. The winding head 73 dispenses and applies pressure to the wire 74 through use of an exit orifice 91, and against the tacky adhesive layer 202. The adhesive layer holds the wire 74 to the substantially non-magnetic armature form while during the winding process, in the winding pattern 203 later required for magnetic torque production. Multiple phases may be wound such that all active length portions lie in a single layer and can wind each phase in separate axially spaced layers. The differences depend on the desired dimensional form factor of the motor/generator as well as the back emf profile produced as the rotor rotates. After all the phase windings 203 are adhered, the air core armature 245 may be over cured or cured by other means. After cured, the air core armature is inserted in the rotor of the motor/generator.

Figure 6:
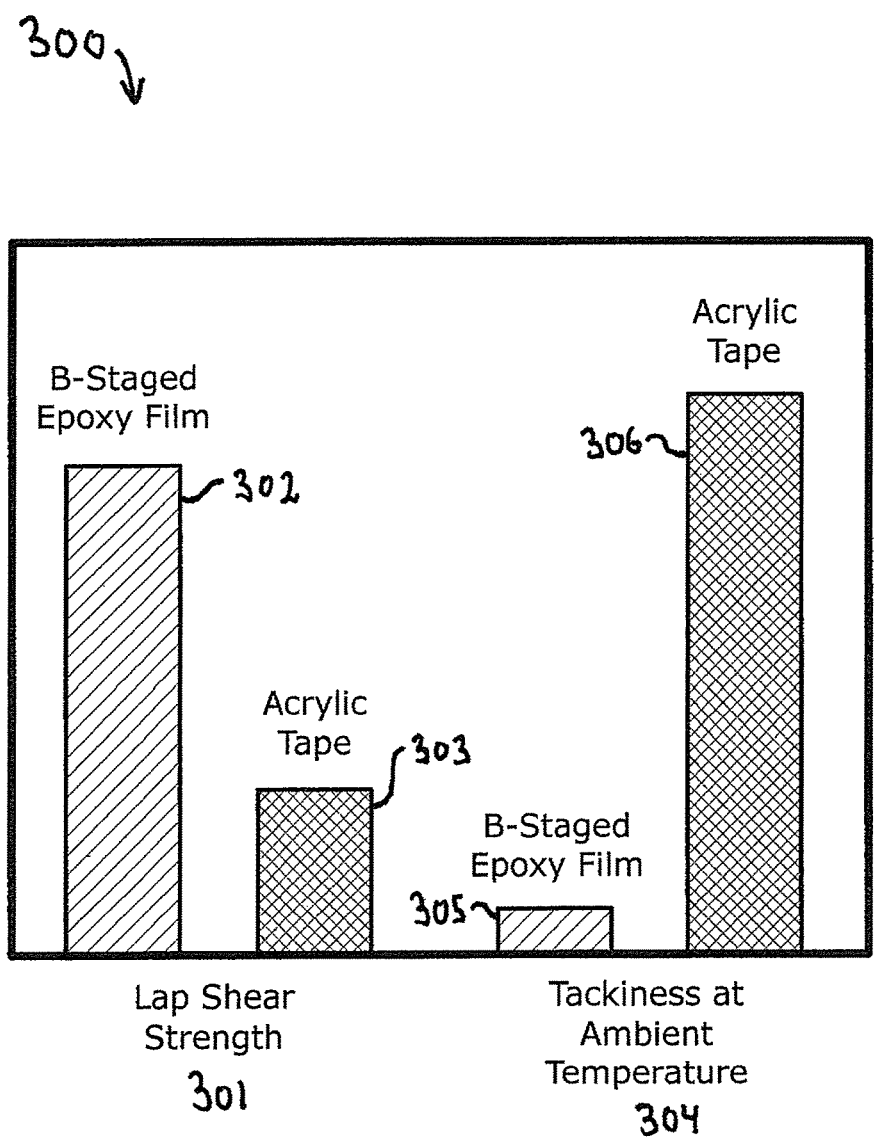
FIG. 6 is a comparison chart between different types of tacky adhesive layers for use in the armature manufacturing process in accordance with the invention.

Polymer adhesives are available in a wide range of types. There are two critical requirements for the tacky adhesive layer for use in accordance with the invention, which are lap shear strength in operating conditions of the motor-generator and the tackiness at ambient temperature during the winding manufacturing process. A comparison chart between different types of tacky adhesive layers for use in the armature manufacturing process in accordance with the invention is shown in FIG. 6. Structural adhesives such as B-staged epoxy film 302 show high lap shear strength compared to pressure sensitive adhesives such as acrylic tape 303. However there is a tradeoff with between operating strength and the winding process ease. B-staged epoxy film 305 shows much lower tackiness at ambient temperature 304 than the acrylic tape 306, making the windings more difficult to adhere to the substantially non-magnetic forms. Low tackiness can be overcome through increasing the temperature during the winding process. Likewise, low lap shear strength can be overcome with the addition of tensioned overlap layer. One advantage of the pressure sensitive adhesive is the lack of requiring curing. Other adhesives, as well as new polymer adhesive formulations are now available that are hybrids, could also be used as long as they provided the required tackiness for high speed winding and sufficient strength and temperature capability while operating the motor/generator.

Figure 7:
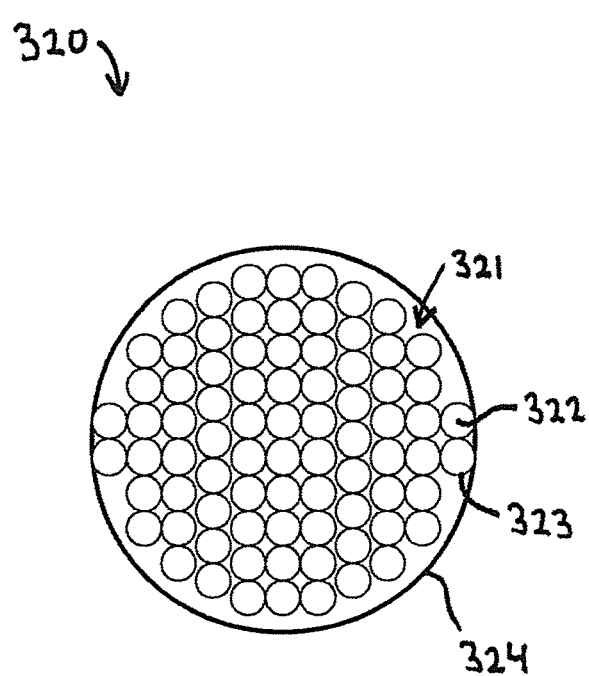
FIG. 7 is a schematic drawing of the cross-section of wire for use in an air core motor-generator in accordance with the invention.

A schematic drawing of the cross-section of wire for use in an air core motor-generator in accordance with the invention is shown in FIG. 7. The wire 320 is comprised of multiple individually insulated conductor strands 322 that are electrically connected in parallel but are electrically insulated from each other along their length 323 when located inside said armature airgap. This construction uses insulation 323 to isolate the small strands 322, which may be several hundred in number, from each other electrically when exposed to the changing magnetic field in the armature airgap. The benefit is that while the strands of the wire 320 may be electrically in parallel by connections outside of the magnetic flux, they are precluded from generating significant eddy current losses in the armature airgap. The small strands also impart the benefit of high wire flexibility which supports the winding process and easy adhesion of the wire to the tacky adhesive. To prevent damage to the strand insulation 323 of the actual strands 322, an outer serve 324 may be used to hold the wire bundle 320 together. Serves can include Mylar tape, nylon thread and other constructions. An additional benefit of using an outer serve 324 is that it facilitates high speed winding process by the winding head, added dielectric breakdown strength and helps prevent untwisting of the bundled strands. Windings could be done with single solid conductor wires, but would result in reduced efficiency from generation of eddy current losses as well as reduced wire flexibility making the winding process slower and more difficult.

Figure 8:
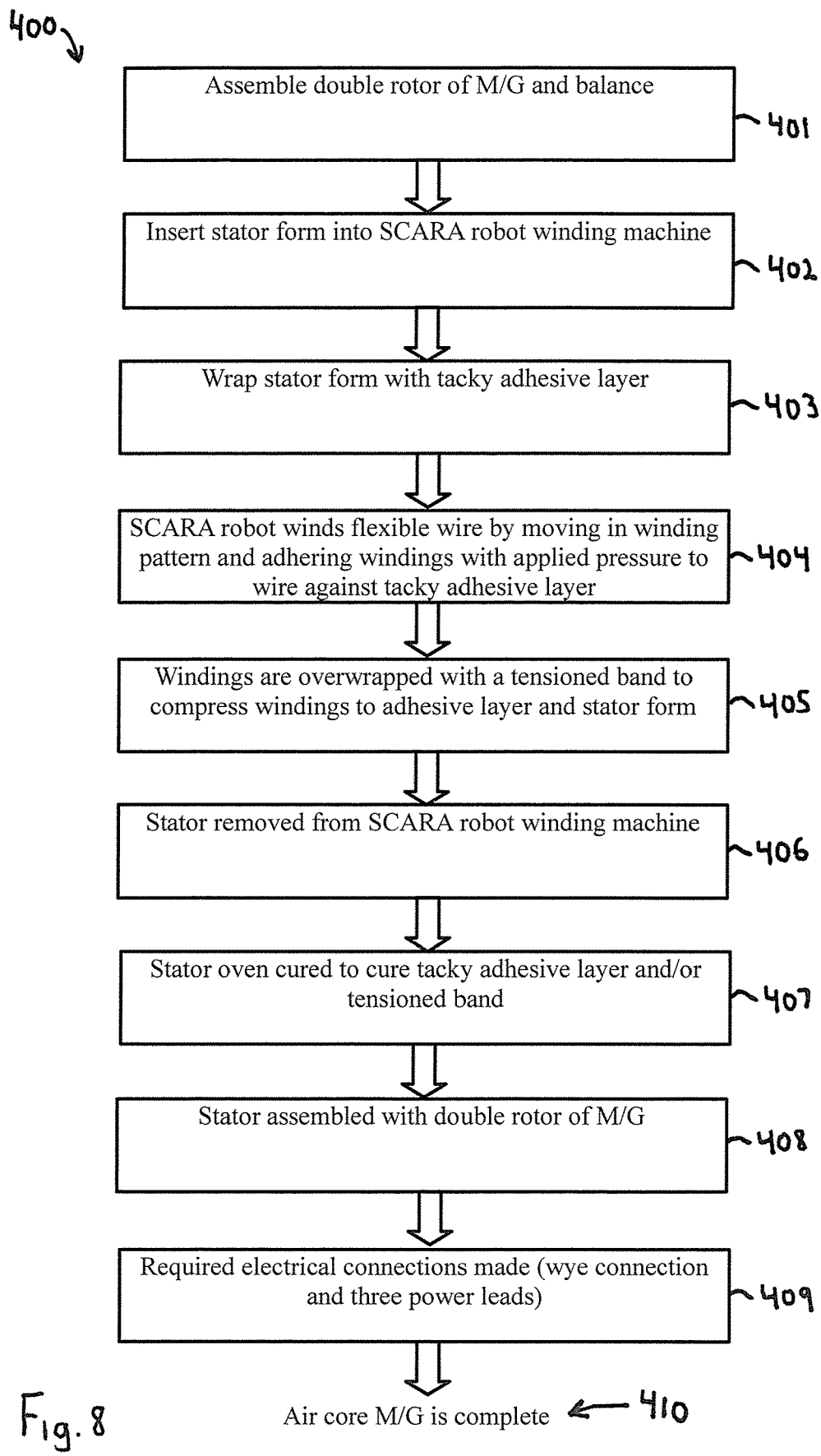
FIG. 8 is a flow chart illustrating a process for assembly of an air core motor-generator in accordance with the invention.

A flow chart illustrating a process for assembly of an air core motor-generator in accordance with the invention is shown in FIG. 8. The process 400 consists of assembling a double rotor of the motor/generator and balancing it 401. A stator form is inserted into a SCARA robot winding machine 402 and is wrapped with a tacky adhesive layer 403. This can be a film adhesive or can be applied by spray or other means, so long as it will be tacky prior to the localized pressure applied to the wire against it. The robot windings the multistrand wire in the winding pattern and adheres the wire against the adhesive layer with applied pressure 404. For a radial gap motor, the windings are then overwrapped with a tensioned band such as a glass fiber tow or even high temperature rated tape to applied compression to the windings against the form 405, after which the stator is removed from the robot winding machine 406. If the tacky adhesive layer or the tensioned band comprises a thermoset polymer, the stator is oven cured 406. The oven curing can be a batch process and cure many stators at the same time to speed production. The stator is assembled with the double rotor of the motor/generator 408 and the required electrical connections are made 409. The air core motor/generator is complete 410.

Figures 9, 10:
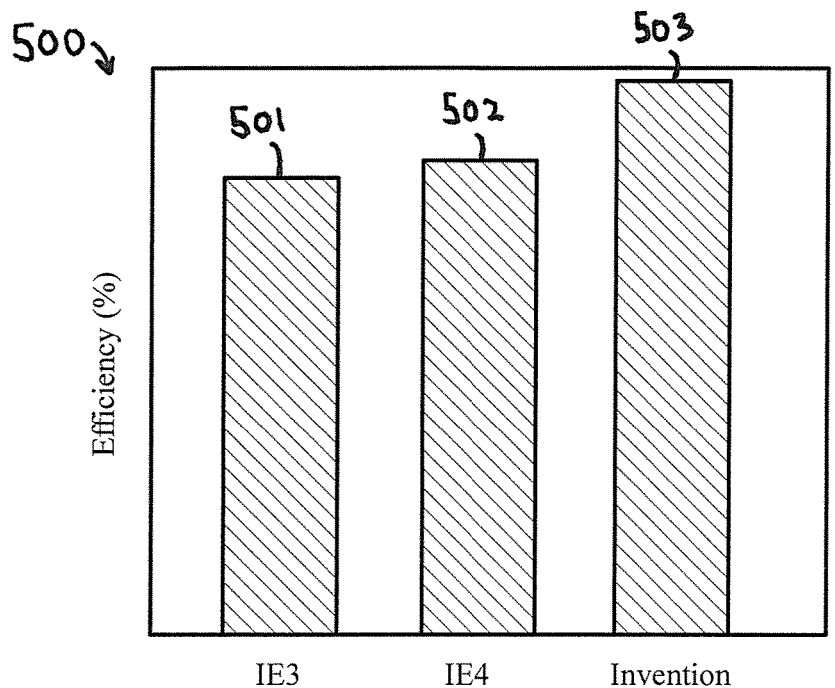
FIG. 9 is a comparison chart illustrating the difference between the required efficiency for a 1 hp 3600 rpm motor meeting the IE3 Premium Efficiency level, IE4 Super Premium Efficiency level and the efficiency of a 1 hp 3600 rpm air core motor-generator in accordance with the invention.
FIG. 10 is a chart highlighting the beneficial attributes of an air core motor-generator manufacturing process in accordance with the invention.

A comparison chart illustrating the difference between the required efficiency for a 1 hp 3600 rpm motor meeting the IE3 Premium Efficiency level, IE4 Super Premium Efficiency level and the efficiency of a 1 hp 3600 rpm air core motor-generator in accordance with the invention is shown in FIG. 9. Besides higher power density capability, particularly in large size motor/generators, a main benefit of motor/generators in accordance with the invention is record efficiency. A comparison of the efficiency 500 shows that a 1 hp, 3600 rpm motor meeting IE3 (Premium Efficiency) 501 has an efficiency of 80.7%. A 1 hp, 3600 rpm motor meeting IE4 (Super Premium Efficiency) 502 has an efficiency of 83.5%. A 1 hp, 3600 rpm motor in accordance with the invention 503 achieves an efficiency of 97.5%. This results in substantial energy cost savings especially when used in high duty cycle applications.

A chart highlighting the beneficial attributes of an air core motor-generator manufacturing process in accordance with the invention is shown in FIG. 10. Unlike prior art processes used for assembly of air core motor-generators, the invention yields substantial benefits. These benefits 600 include no armature resin potting required 601. Additionally, there is no armature mold clean up required 602. This saves significant labor, manufacturing time and costs of multiple tooling. No hand assembly is required 603 and armature windings time is extremely fast 604, at about 2 minutes with a 60 m/min wind speed. Part of air core armature construction is the making of electrical connections. Unlike some methods that require connections of multiple coils per phase, the armatures of the invention have minimized electrical connections 605, requiring only four which consist of a single wye connection and 3 power leads. The process for construction of the air core armature used yields exceptional armature manufacturing consistency 606. The process for construction of the entire air core motor-generator produces motor-generators with exceptional operating efficiency 607.

Obviously, numerous modifications and variations of the described preferred embodiment are possible and will occur to those skilled in the art in light of this disclosure of the invention. Accordingly, we intend that these modifications and variations, and the equivalents thereof, be included within the spirit and scope of the invention as defined in the following claims, wherein we claim:

The invention claimed is:

1. A process for assembly of a motor-generator comprising:
    positioning a stator of an air core motor-generator proximate to a selective compliance assembly robot arm;
    applying an adhesive film to a surface on said stator;
    winding airgap armature windings onto said surface of said stator with said robot arm, said robot arm comprising a winding head that traverses a winding pattern and dispenses flexible wire comprised of bundled multiple individually insulated conductor strands that are electrically connected in parallel but are electrically insulated from each other at least along portions of their length;
    said winding head simultaneously applying pressure to said flexible wire against said adhesive film and instantaneously adhering said flexible wire to said stator while traversing said winding pattern;
    said adhesive film providing both instantaneous adhesion of said flexible wire in said winding pattern and transfer of torque to said stator in the operation of said motor-generator;
    said winding pattern including active length portions that generate electromagnetic induced force in operation and are adhered to said stator, wherein an individual wire of said active length portions lies in a plane and said robot arm provides compliance to said winding head in said plane as said individual wire is adhered to said stator lying adjacent with other wires in said winding pattern;
    assembling said stator with a rotor having an array of permanent magnets driving magnetic flux across an air gap between said magnets and said stator surface for production of electromagnetically induced torque between said rotor and said stator in said motor-generator.

2. A process for assembly of a motor-generator as described in claim 1, wherein:
    said robot arm regulates said pressure applied to said flexible wire against said adhesive through use of compliance perpendicular to said stator.

3. A process for assembly of a motor-generator as described in claim 1, wherein:
    windings of a single phase are wound continuously together yielding only two ends.

4. A process for assembly of a motor-generator as described in claim 1, wherein:
    multiple phases of said airgap windings are wound consecutively and are subsequently cut to produce separate individual phase windings.

5. A process for assembly of a motor-generator as described in claim 1, wherein:
    said stator is supported and rotationally indexed about an axis perpendicular to the direction said pressure is applied by said winding head as traversing said winding pattern.

6. A process for assembly of a motor-generator as described in claim 1, wherein:
    said robot arm dispenses said wire and applies said pressure to said wire using an orifice on said winding head.

7. A process for assembly of a motor-generator as described in claim 1, wherein:
    said stator is nonmagnetic and is supported between two opposing surfaces of said rotor of said motor-generator.

8. A process for assembly of a motor-generator comprising:
    positioning a stator of a slotless motor-generator proximate to a serial robot arm;
    applying an adhesive film to a surface on said stator;
    winding armature windings onto said surface of said stator by said robot arm, said robot arm comprising a winding head that traverses the winding pattern and dispenses flexible wire comprised of bundled multiple individually insulated conductor strands that are electrically connected in parallel but are electrically insulated from each other at least along portions of their length;
    said winding head simultaneously applying pressure to said wire against said adhesive film and adhering said wire to said stator while traversing said winding pattern;
    said adhesive film providing both progressive adhesion of said winding pattern to said stator and transfer of torque to said stator in the operation of said motor-generator;
    said robot arm constructed having a parallel-axis joint layout and imparting compliance to said winding head, wherein multiple phase windings are adjacently wound together directly onto said stator;
    assembling said stator with a rotor having an array of permanent magnets to produce magnetic flux cut by said windings during rotation of said rotor for production of electromagnetically induced torque between said rotor and said stator in said motor-generator.

9. A process for assembly of a motor-generator as described in claim 8, wherein:
    said robot arm regulates said pressure applied to said flexible wire against said adhesive through use of compliance perpendicular to said stator.

10. A process for assembly of a motor-generator as described in claim 8, wherein:
    windings of a single phase are wound continuously together yielding only two ends.

11. A process for assembly of a motor-generator as described in claim 8, wherein:
    multiple phases of said airgap windings are wound consecutively are subsequently cut to produce separate individual phase windings.

12. A process for assembly of a motor-generator as described in claim 8, wherein:
    said stator is supported and rotationally indexed about an axis perpendicular to the direction said pressure is applied by said winding head as traversing said winding pattern.

13. A process for assembly of a motor-generator as described in claim 8, wherein:

said robot arm dispenses said wire and applies said pressure to said flexible wire using an orifice on said winding head.

14. A process for assembly of a motor-generator as described in claim 8, wherein:
said flexible wire is wrapped with a serve that both holds said conductor strands together while passing through said winding head and bonds with said adhesive film.

15. A process for assembly of a motor-generator comprising:
positioning a stator of a motor-generator proximate to a serial robot arm;
applying an adhesive to a surface on said stator;
applying armature windings onto said surface of said stator by said robot arm, said robot arm comprising a winding head that applies wire comprised of bundled multiple individually insulated conductor strands that are electrically connected in parallel but are electrically insulated from each other at least along portions of their length;
said winding head applying pressure to said wire against said adhesive and adhering said wire to said stator;
said adhesive providing both adhesion of said winding pattern to said stator and transfer of force to said stator in the operation of said motor-generator;
said winding pattern including active length portions that generate electromagnetic induced force and are adhered to said stator with said robot arm moving said winding head with compliance in at least two axes of movement in adhering said active length portions to said stator;
assembling said stator with a rotor having an array of permanent magnets secured to a rotor surface facing said stator surface, with said stator surface facing said rotor permanent magnets across an air gap for production of electromagnetically induced torque between said rotor and said stator in said motor-generator.

16. A process for assembly of a motor-generator as described in claim 15, wherein:
said robot arm regulates said pressure applied to said wire against said adhesive through use of active compliance perpendicular to said stator.

17. A process for assembly of a motor-generator as described in claim 15, wherein:
windings of a single phase are wound continuously together yielding only two ends.

18. A process for assembly of a motor-generator as described in claim 15, wherein:
said stator is supported and rotationally indexed about an axis perpendicular to the direction said is pressure applied by said winding head as traversing said winding pattern.

19. A process for assembly of a motor-generator as described in claim 15, wherein:
said robot arm dispenses said wire and applies said pressure to said wire using an orifice on said winding head.

20. A process for assembly of a motor-generator as described in claim 15, wherein:
said wire is wrapped with a serve that both holds said conductor strands together while passing through said winding head and bonds with said adhesive film.

\* \* \* \* \*